(12) United States Patent
Diamond et al.

(10) Patent No.: US 12,565,162 B2
(45) Date of Patent: Mar. 3, 2026

(54) VEHICLE POWER OUTLET ADVISORY SYSTEM

(71) Applicant: Ford Global Technologies, LLC, Dearborn, MI (US)

(72) Inventors: Brendan Diamond, Grosse Pointe, MI (US); Stuart C. Salter, White Lake, MI (US); John Robert Van Wiemeersch, Novi, MI (US); Keith Weston, Canton, MI (US)

( * ) Notice: Subject to any disclaimer, the term of this patent is extended or adjusted under 35 U.S.C. 154(b) by 306 days.

(21) Appl. No.: 18/324,804

(22) Filed: May 26, 2023

(65) Prior Publication Data

US 2024/0391405 A1    Nov. 28, 2024

(51) Int. Cl.
| | |
|---|---|
| *B60R 16/033* | (2006.01) |
| *B60Q 9/00* | (2006.01) |
| *G06F 3/01* | (2006.01) |
| *G06T 7/70* | (2017.01) |
| *G06V 20/59* | (2022.01) |
| *G06V 40/20* | (2022.01) |
| *H02J 7/00* | (2006.01) |

(52) U.S. Cl.
CPC .............. *B60R 16/033* (2013.01); *B60Q 9/00* (2013.01); *G06F 3/017* (2013.01); *G06T 7/70* (2017.01); *G06V 20/593* (2022.01); *G06V 40/20* (2022.01); *H02J 7/0042* (2013.01); *G06T 2207/30196* (2013.01); *G06T 2207/30268* (2013.01)

(58) Field of Classification Search
CPC ........... B60Q 9/00; B60R 16/02; B60R 16/03;

B60R 16/033; G06F 3/017; G06T 2207/30196; G06T 2207/30268; G06T 7/70; G06V 20/593; G06V 40/20
See application file for complete search history.

(56) References Cited

U.S. PATENT DOCUMENTS

| | | | |
|---|---|---|---|
| 9,276,437 | B2 | 3/2016 | Partovi et al. |
| 9,338,170 | B2 | 5/2016 | Ricci |

(Continued)

FOREIGN PATENT DOCUMENTS

| | | |
|---|---|---|
| CN | 111731291 A | 10/2020 |

OTHER PUBLICATIONS

Dr. Bindu B. et al.,"Power Management Optimization in Hybrid Electric Vehicle Using Battery Management Systems" (Oct.-Dec. 2021).

(Continued)

*Primary Examiner* — Charles J Han
(74) *Attorney, Agent, or Firm* — Frank Lollo; Eversheds Sutherland (US) LLP

(57) ABSTRACT

Vehicle power outlet advisory systems and methods are disclosed. An example method executed by a processor of a vehicle power outlet advisory system in a vehicle can include detecting a gesture made by an individual. The gesture may indicate that the individual is seeking assistance to power a device. The processor can determine a power consumption of the device based on identifying a type, a brand, or a model number of the device, and can then identify a power source in the vehicle that is compatible for powering the device. The processor may further identify a first power outlet in the vehicle that is coupled to the power source, followed by issuing instructions to the individual for locating the first power outlet.

20 Claims, 4 Drawing Sheets

(56) References Cited

U.S. PATENT DOCUMENTS

| 9,744,858 | B2 | 8/2017 | Hall et al. | |
|---|---|---|---|---|
| 2015/0108830 | A1* | 4/2015 | Gaynier | B60R 16/03 |
| | | | | 307/9.1 |
| 2015/0352953 | A1* | 12/2015 | Koravadi | B60K 35/00 |
| | | | | 701/36 |
| 2019/0217715 | A1* | 7/2019 | Christen | B60L 53/31 |

OTHER PUBLICATIONS

Jeremy Laukkonen "How a Car Power Adapter Can Run All Your Electronics" (Sep. 2021).

* cited by examiner

VEHICLE POWER OUTLET ADVISORY SYSTEM

BACKGROUND

Some vehicles are equipped with electrical power outlets that can be used for powering various devices such as lights, personal devices, and power tools. It is desirable to address certain issues associated with the use of these electrical power outlets such as, for example, issues related to locating a suitable electrical power outlet for use among multiple electrical power outlets.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
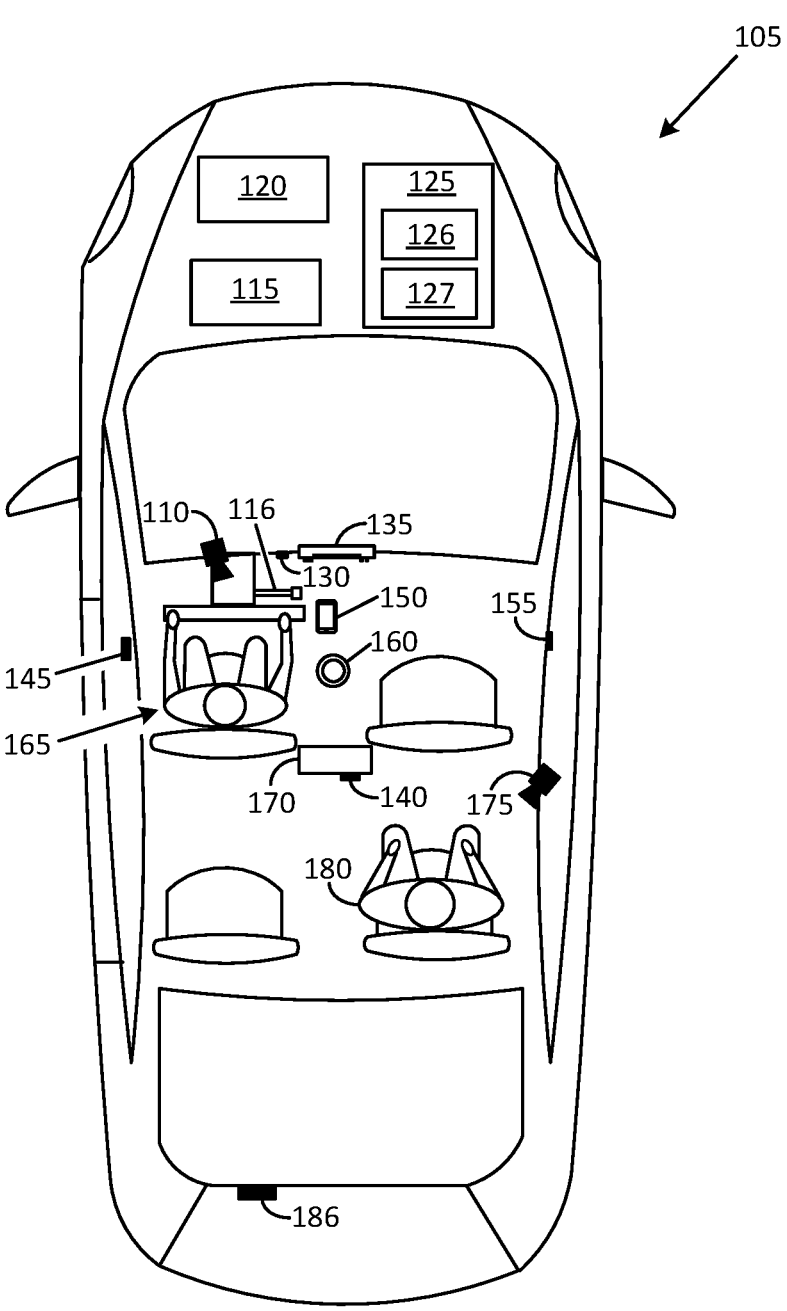
FIG. 1 shows an example vehicle that includes a vehicle power outlet advisory system in accordance with an embodiment of the disclosure.

In terms of a general overview, embodiments described in this disclosure are generally directed to vehicle power outlet advisory systems and methods. It must be understood that the various operations described herein should always be implemented and/or performed in accordance with the owner manual and safety guidelines. An example method in accordance with the disclosure that is executed by a processor of a vehicle power outlet advisory system in a vehicle can include detecting a gesture made by an individual. The gesture may indicate that the individual is seeking assistance to power a device. In a first example scenario, powering the device can be directed at turning on and operating the device such as, for example, inserting a wireless radio transmitter or a reading lamp into a 12V electrical socket. In a second example scenario, powering the device can be directed at charging a rechargeable battery of the device such as, for example, recharging a battery of a smartphone by plugging a cable into a universal serial bus (USB) socket. The processor can determine a power consumption of the device based on identifying a type, a brand, or a model number of the device, and can then identify a power source in the vehicle that is compatible for powering the device. The processor may then identify a first power outlet in the vehicle that is coupled to the power source, followed by issuance of instructions to the individual for locating the first power outlet.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the term "power outlet" as used herein refers to an electrical power outlet. The word "information" as used herein pertains to any of various forms of data that can be processed by a processor (digital data, digital images, detector signals, etc.). The word "image" as used herein encompasses one or more images in one or more forms. Thus, for example, a description herein of an action associated with an "image" must be understood to indicate an action performed upon a single image in some scenarios and upon multiple images in some other scenarios. The multiple images can be included in various forms such as, for example, in the form of a video clip, and/or in the form of real-time video. The word "detector," which may be used interchangeably with the word "sensor," as used herein refers to any device than may be used to obtain information about an object, to detect the presence of an object, and/or to detect actions performed by individuals. The word "object" and the word "item" are used in this disclosure in an interchangeable manner. The word "vehicle" as used in this disclosure can pertain to any one of various types of vehicles such as cars, vans, sports utility vehicles, trucks, electric vehicles, gasoline vehicles, and hybrid vehicles. It must be understood that words such as "implementation," "application," "scenario," "case," and "situation" as used herein are an abbreviated version of the phrase "In an example ("implementation," "application," "scenario," "case," "approach," and "situation") in accordance with the disclosure." It must also be understood that the word "example" as used herein is intended to be non-exclusionary and non-limiting in nature.

FIG. 1 shows a vehicle 105 that includes a vehicle power outlet advisory system 125 in accordance with an embodiment of the disclosure. The vehicle 105 may further include components such as, for example, a vehicle computer 120, an infotainment system 135, a power supply system 115, and various types of sensors, detectors, and imaging devices. These components may be communicatively coupled to the vehicle power outlet advisory system 125 via a wired communication system and/or a wireless communication system. The vehicle 105 may further include one or more electrical power outlets that are coupled to the power supply system 115 and are accessible for use by various individuals such as, for example, a driver 165 and a passenger 180.

In the illustrated example, the vehicle 105 is a sedan. However, it must be understood that the systems and methods of operation described herein are equally applicable to various other types of vehicles such as, for example, a truck, a van, a sports utility vehicle, or a semi-trailer truck. Thus, for example, a description pertaining to characteristics and operations of an electrical power outlet provided in the sedan that is illustrated in FIG. 1 is equally applicable to an electrical power outlet provided in a van, a truck, a semi, an electric vehicle, or a hybrid electric vehicle, for example. Furthermore, in the illustrated example, the vehicle 105 is a driver-operated vehicle. However, the description provided herein is equally applicable to an autonomous vehicle and the various actions described herein with respect to a driver 165 of the vehicle 105 may be carried out by any person seated in the autonomous vehicle. In the illustrated example scenario, the driver 165 is seated in a driver seat of the vehicle 105 and the passenger 180 is seated in a rear passenger seat of the vehicle 105.

The vehicle computer 120 may perform various functions of the vehicle 105, such as, for example, controlling engine operations (fuel injection, speed control, emissions control, braking, etc.), managing climate controls (air conditioning, heating etc.), activating airbags, and issuing messages (check engine light, bulb malfunction, low tire pressure, etc.). The vehicle computer 120 may also provide various types of information to the vehicle power outlet advisory system 125, such as, for example, information pertaining to operations associated with the vehicle 105 (movement status, parked status, vehicle occupancy status, etc.).

The infotainment system 135 can be an integrated unit that includes various components such as a radio, a display screen, a speaker, and other components such as a USB access port, a Bluetooth® system, Ultra-Wideband (UWB) system, and a global positioning satellite (GPS) navigation system. In an example implementation, the display screen may include a graphical user interface (GUI) for use by an occupant of the vehicle 105. The GUI may be used for various purposes such as to enter commands for interacting with the GPS navigation system, to select a phone number for making a phone call, and to make a song selection. In an example implementation, the GUI may be used by the driver 165 of the vehicle 105 to communicate with the vehicle power outlet advisory system 125 in accordance with the disclosure.

The vehicle 105 can further include one or more detectors, sensors, and/or imaging devices. The detectors can be any of various types of detection devices such as, for example, a motion sensor, a magnetic sensor, a radar detector, a sonar detector, a capacitive sensor, a light detection and ranging (LIDAR) detector, and/or an infrared detector. The sensors can be any of various types of sensing devices such as, for example, a seat sensor that is configured to provide to the vehicle computer 120 and/or the vehicle power outlet advisory system 125 a signal when a person sits on a seat in which the seat sensor is provided. In one case, the seat sensor can be a pressure transducer that produces an electrical signal when pressure is applied upon the pressure transducer as a result of the person sitting on the seat. Another type of sensor can be a position sensor coupled to a gearshift 116 that provides information about a position of the gearshift 116 (in drive, in park, in reverse, or in neutral). The information may be conveyed to the vehicle power outlet advisory system 125 for determining a status of the vehicle 105 (moving, stopped, etc.).

The imaging devices can include any of various types of cameras such as, for example, a black-and-white camera, a color camera, an ultraviolet (UV) camera, a thermal camera, or an infrared camera. In the illustrated implementation, a camera 110 and a camera 175 are example devices configured to provide information to the vehicle power outlet advisory system 125 in the form of images. In other implementations, additional cameras and/or other types of devices may be used to provide information to the vehicle power outlet advisory system 125. The images provided by the cameras may be evaluated by the vehicle power outlet advisory system 125 for various purposes. In an example scenario, the vehicle power outlet advisory system 125 may evaluate images provided by the camera 110 to detect a presence of one or more individuals seated in the vehicle 105 and/or to detect objects that may be coupled to electrical power outlets of the vehicle 105. The vehicle power outlet advisory system 125 may execute various actions upon one or more electrical power outlets provided in the vehicle 105 based on evaluating such images.

The power supply system 115 can include any of various types of components that produce one or more of various types of voltages such as, for example, 5V DC, 12V DC, 110V AC, and 220V AC that may be coupled to the various electrical power outlets provided in the vehicle 105. In an example scenario, an electrical power outlet may be a USB socket that includes a 5V DC tab. In another example implementation, the power supply system 115 can include a battery that produces 12V DC. The 12V DC voltage may be provided for use by an occupant of the vehicle 105 via an electrical power outlet provided in the form of a cigarette lighter socket, for example.

The example electrical power outlets provided in the vehicle 105 include a number of electrical power outlets that are located in a cabin area of the vehicle 105 such as, for example, an electrical power outlet 130 located on a lower portion of an instrument console, an electrical power outlet 145 located on a door adjacent to the driver 165, an electrical power outlet 155 located on a door adjacent to a front passenger seat of the vehicle 105, an electrical power outlet 140 located on a console panel 170 that is accessible by the passenger 180 seated in the rear passenger seat of the vehicle 105, and a charging pad 160 located on a console that is accessible by the driver 165 and a passenger seated next to the driver 165 in the front portion of the cabin area. The vehicle 105 can further include electrical power outlets that are located outside the cabin area, such as, for example, an electrical power outlet 186 that is located in a trunk of the vehicle 105 (or in the case of a van/truck, in a cargo area of the van/truck).

The electrical power outlets may have various forms, shapes, pin configurations, features, and characteristics (USB, wireless charging pad, cigarette-lighter style, twohole socket, three-hole socket, US-type layout, European-style layout, etc.) and may provide various types of voltages that are provided by the power supply system 115. For example, the electrical power outlet 130 and the charging pad 160 may be configured for charging a personal device such as, for example, a personal device 150 carried by the driver 165 and/or a device carried by an occupant of the vehicle 105. The personal device 150 can be any of various devices such as, for example, a smartphone, a smartwatch, or a smart wearable.

In some cases, the electrical power outlets provided outside the cabin of the vehicle 105 may be configured for some types of use that may be different from those applicable to the electrical power outlets inside the cabin of the vehicle 105. For example, in one implementation, the electrical power outlet 186 located in the trunk (or cargo area) of the vehicle 105 may be a two-pronged electrical socket or a three-pronged electrical socket that offers 110V AC voltage for operating and/or charging a battery of an item such as, for example, a rechargeable battery of a power drill, and/or for operating an item such as a lawn mower or a jack hammer. Some of the items that are plugged into the electrical power outlets of the vehicle 105 are portable and may be transported in the trunk of (or cargo area) the vehicle 105 while plugged into an electrical power outlet of the vehicle 105. One example of such an item is a power drill that may be plugged into the electrical power outlet 186.

The vehicle power outlet advisory system 125 is configured to perform various operations associated with providing assistance with respect to electrical power outlets in the vehicle 105. More particularly, a processor 126 of the vehicle power outlet advisory system 125 is configured to access a memory 127 and execute computer-executable instructions stored in the memory 127 for performing actions such as, for example, detecting a gesture made by an occupant of the vehicle 105 that indicates a request for help in locating an electrical power outlet in the vehicle 105 that is suitable for use by the occupant of the vehicle 105, and responding to the request by performing actions such as, for example, determining an operational status of the vehicle 105 (moving, stationary, etc.), identifying a location of an occupant in the vehicle 105 (in the driver seat, a passenger seat), identifying one or more aspects of a device that the occupant of the vehicle 105 desires to couple to an electrical power outlet in the vehicle 105 (type of device, model number, brand, operating voltage, current draw, type of plug provided in device, etc.), and identifying an accessibility of an electrical outlet by an occupant of the vehicle 105 when seated in the vehicle 105 (within reach of the occupant of the vehicle 105 when the vehicle 105 is moving, for example). After identifying a suitable electrical power outlet, the vehicle power outlet advisory system 125 may issue guidance on how to locate and use the electrical power outlet. In an example scenario, the vehicle power outlet advisory system 125 may display step-by-step instructions in a pictorial format on the GUI of the infotainment system 135 and/or may issue oral instructions via the infotainment system 135. These aspects are described below in further detail.

Figure 2:
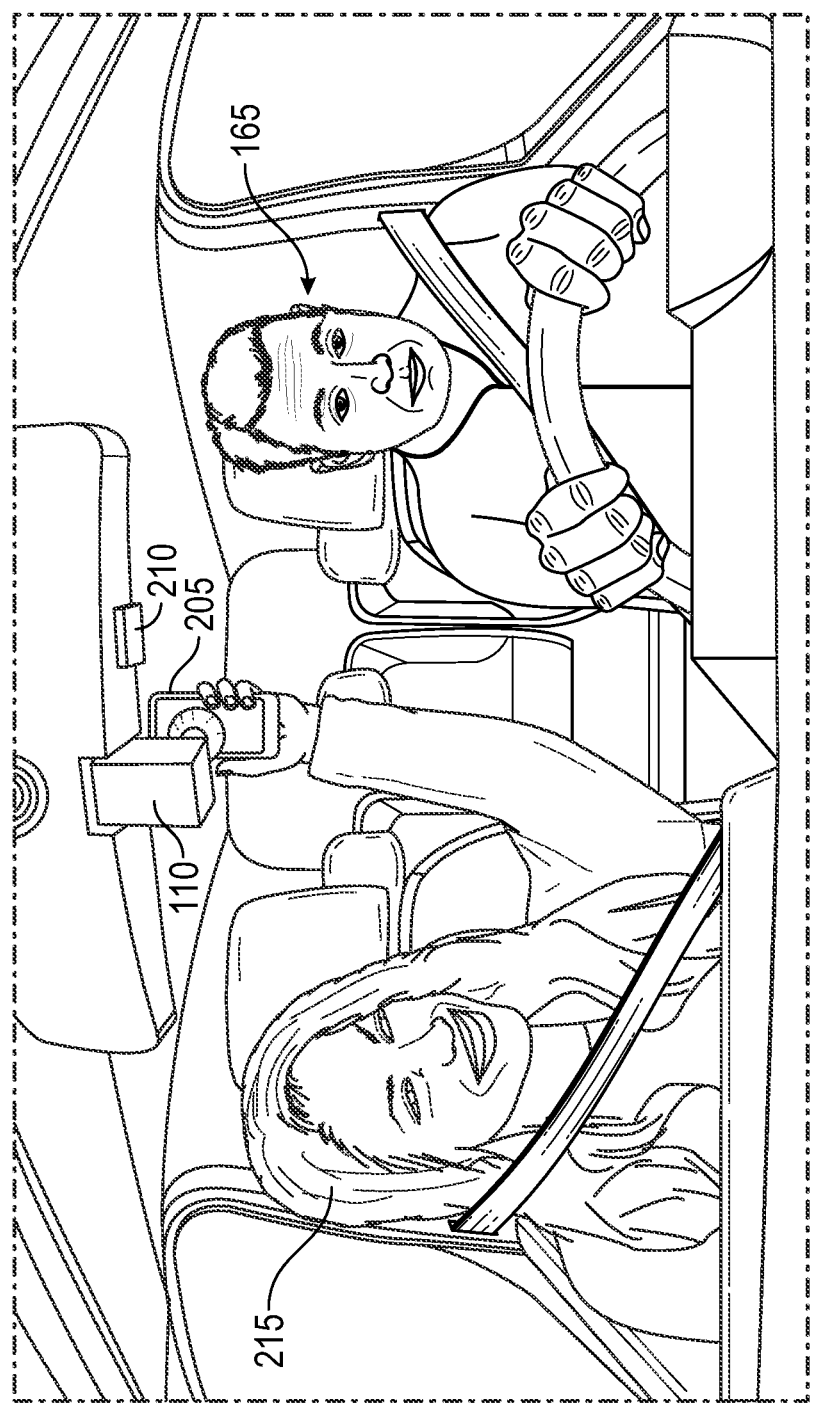
FIG. 2 illustrates an example scenario associated with operations of a vehicle power outlet advisory system in accordance with an embodiment of the disclosure.

FIG. 2 illustrates an example scenario associated with operations of the vehicle power outlet advisory system 125 in accordance with an embodiment of the disclosure. The description below is with reference to a passenger 215, but it must be understood that the description is equally applicable to any other occupant of the vehicle 105. In this example scenario, the passenger 215 is showing a gesture to indicate that the passenger 215 desires assistance in locating a suitable electrical power outlet in the vehicle 105 for charging and/or powering a device 205. The device 205 can be any of various types of devices such as, for example, the personal device 150 described above, an electrical shaver, or a medical gadget.

A motion sensor 210 that can be mounted adjacent to the camera 110 may detect the passenger 215 making the gesture and conveys a signal to the vehicle power outlet advisory system 125. The vehicle power outlet advisory system 125 may then instruct the camera 110 to capture an image that includes the passenger 215 and the device 205. The image is conveyed to the vehicle power outlet advisory system 125 and evaluated by the vehicle power outlet advisory system 125 to identify one or more features of the device 205 such as, for example, a product type, a brand, and a model number. The vehicle power outlet advisory system 125 may then obtain information about the device 205 from a database that may be a part of the vehicle power outlet advisory system 125 or provided in components such as a server computer, a cloud computer, or a cloud storage device. Information stored in components outside the vehicle 105 may be obtained via a wireless communications system (not shown) of the vehicle 105.

Information about the device 205 can include, for example, an operating voltage (5V, 110V, 220V, etc.), an operating frequency (60 Hz, 60 Hz, etc.), current draw, a type of plug (USB, co-axial, etc.), and whether wireless charging is supported. The vehicle power outlet advisory system 125 may use this information to perform additional actions that are described below.

In another example implementation, in lieu of, or in addition to, the gesture described above, the passenger 215 may provide, to the vehicle power outlet advisory system 125, information about the device 205 in other ways. For example, the passenger 215 may describe various aspects of the device 205 by speaking into a microphone (not shown). The vehicle power outlet advisory system 125 may evaluate the information provided by the passenger 215 by use of techniques such as speech recognition and artificial intelligence, for example.

Figure 3:
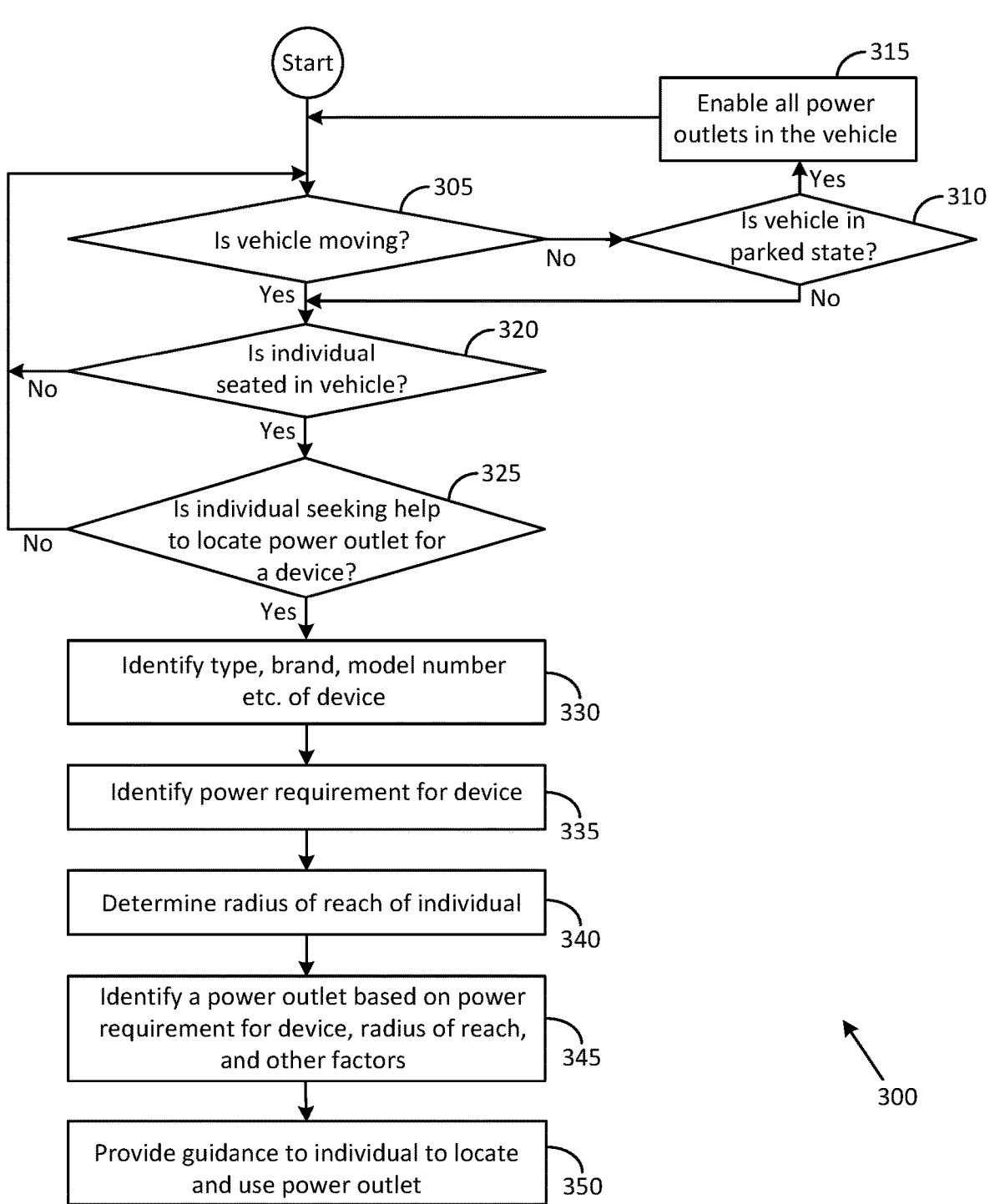
FIG. 3 shows a flowchart of an example method of operation of a vehicle power outlet advisory system in accordance with an embodiment of the disclosure.

FIG. 3 shows a flowchart 300 of an example method of operation of a vehicle power outlet advisory system in accordance with an embodiment of the disclosure. The flowchart 300 illustrates a sequence of operations that can be implemented in hardware, software, or a combination thereof. In the context of software, the operations represent computer-executable instructions stored on one or more non-transitory computer-readable media such as the memory 127 of the vehicle power outlet advisory system 125, that, when executed by one or more processors such as the processor 126 of the vehicle power outlet advisory system 125, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel.

At block 305, a determination is made whether a vehicle in which the vehicle power outlet advisory system is provided is moving. In an example scenario, the determination may be made by evaluating a signal provided by a detector that is coupled to a gearshift of the vehicle. In another example scenario, the determination may be made by evaluating an image and/or a video clip conveyed to the vehicle power outlet advisory system by one or more cameras mounted in the vehicle. In another example scenario, the determination may be made by evaluating a signal received by the vehicle power outlet advisory system from a vehicle computer of the vehicle. The signal can be, for example, a speed of travel of the vehicle, a revolutions per minute (rpm) of an engine or electric motor of the vehicle, and/or a gear engagement in a gear system of the vehicle.

In one case, the determination made at block 305 can indicate that the vehicle is not moving. The vehicle may be stationary for a variety of reasons. For example, the vehicle may be stationary due to being parked at a traffic signal or may be stationary as a result of being parked in a driveway or a parking lot. At block 310, a determination is made whether the vehicle is stopped temporarily or is in a parked state. In an example scenario, the determination may be made by evaluating a signal provided by a detector that is coupled to a gearshift of the vehicle. If the gearshift is in a "Park" position (rather than in a "Drive," or "Reverse" position), at block 315, some or all electrical power outlets located outside the cabin area of the vehicle may be turned on. For example, when the vehicle is a truck or van, electrical power can be turned on by coupling power from a power supply system into all electrical power outlets located in a cargo area of the truck or van. Energizing such electrical power outlets allows a driver and/or passenger of the vehicle to use the electrical power outlets for powering devices that are not generally operated when the vehicle is moving such as, for example, a jack hammer, a light assembly, a fan, a portable air conditioning unit, or a lawn mower.

If, at block 305, it is determined that the vehicle is moving, at block 320, a determination is made whether an individual is seated in the vehicle. In an example scenario, the individual is a driver seated in a driver seat of the vehicle. In another example scenario, the individual is a passenger seated in one of the passenger seats of the vehicle. A determination may also be made to determine if the individual is strapped in by use of a seat belt.

If no individual is present in the vehicle, the actions indicated at block 305 and subsequent blocks are carried out. If an individual is present in the vehicle, at block 325 a determination is made whether the individual is seeking help to locate an electrical power outlet in the vehicle. The determination can be carried out in various ways. In an example scenario, a motion detector provided in the cabin of the vehicle may detect motion and convey a signal to the vehicle power outlet advisory system. The vehicle power outlet advisory system may instruct one or more cameras that are provided in the cabin to capture one or more images of the interior portion of the cabin. The vehicle power outlet advisory system may then evaluate the image(s) to determine if the individual is seeking help to locate an electrical power outlet in the vehicle. Evaluating the image(s) may include examining positioning of various body parts of the individual such as, for example, an arm, a mouth, a facial expression, etc. In an example scenario, the individual may hold up a device in view of a camera and may point to the device or to a connector of the device to indicate that the individual would like to charge a rechargeable battery in the device. The individual may also vocalize his/her request for help. For example, the individual may say: "I need help to charge my phone!" A microphone provided in the vehicle may convey the spoken request to the vehicle power outlet advisory system and the vehicle power outlet advisory system may use techniques such as voice recognition, for example, to interpret the request.

At block 330, various features and characteristics of the device may be identified, particularly with reference to power requirements of the device and physical aspects associated with coupling the device to an electrical outlet. For example, a type, a brand, a model number, and a connector of the device may be identified. In an example scenario, the device can be a smartphone (type) having a model number xxx-30389 (Ver. 2) and manufactured by ABC company. The smartphone has a universal serial bus (USB) connector that accepts a charging cable and may also have a capability to be charged wirelessly by use of a wireless charging pad. Based on such information, the vehicle power outlet advisory system can determine that either a USB socket or a wireless charging pad can be used for charging the smartphone.

At block 335, a power requirement for the device may be determined. In an example implementation, the power requirement may be determined based on a type, a model, a brand etc. of the device (obtained at block 325). The power requirement information may be obtained from a database that can be a part of the vehicle power outlet advisory system or can be stored in a server computer, a cloud computer, or a cloud storage device. The power requirement information can include, for example, an electrical current rating of the device (5 Amps, for example), a power rating of the device (5 W, for example), a power consumption of the device, and a voltage rating of the device (110V AC at 50 Hz, for example).

At block 340, a radius of reach of the individual seated in the vehicle may be determined. In an example scenario, the individual is the driver seated in the driver seat. The vehicle power outlet advisory system may determine that a radius of reach of the driver extends from the driver seat to a center console of the vehicle and to an edge of a glove compartment on the front passenger side of the vehicle. The driver can, with a bit of effort, lean and reach a passenger-side door of the vehicle. However, in view of the vehicle being in motion, the vehicle power outlet advisory system may place the passenger-side door of the vehicle off-limits to the driver so as to prevent the driver from changing his/her driving position when attempting to couple the device to an electrical power outlet located on, or near, the passenger-side door. In an example embodiment, all the electrical power outlets in the vehicle may be placed off-limits to the driver when the vehicle is in motion so as to allow the driver to focus on driving the vehicle and may be made available for use when the vehicle is in a parked condition. Similarly, electrical power outlets that are located on the front panel of the vehicle and around the driver may be placed off-limits to a passenger seated in a rear passenger seat because these outlets are typically beyond the reach of the passenger, particularly when the vehicle is moving.

At block 345, the vehicle power outlet advisory system may identify a first electrical power outlet among the various electrical power outlets that are coupled to a power source in the vehicle. The first electrical power outlet may be identified on the basis of various factors such as, for example, the example ones described above with respect to block 330, block 335, and block 340. In an example embodiment, the first electrical power outlet may be identified on the basis of the first electrical power outlet being located within a threshold distance from an individual seated in the vehicle such as, for example, within a radius of reach of a driver of the vehicle. Identifying the first electrical power outlet may further include disregarding some of the electrical power outlets in the vehicle. For example, electrical power outlets that are located beyond the radius of reach of the driver, particularly, electrical power outlets located outside the cabin of the vehicle (such as, for example, in a cargo area, a trunk, or a frunk of the vehicle) are disregarded. Electrical power outlets that are non-functional or defective in some ways are also disregarded. The vehicle power outlet advisory system also disregards an electrical power outlet that is already in use, or based on the electrical power outlet having reached an operational power capacity. In some cases, the vehicle power outlet advisory system may determine that the first electrical power outlet is more efficient for use (for example, is a pluggable type) than a second electrical power outlet (for example, a wireless charging pad having a low charging capability). A ranking procedure and/or a prioritization scheme may be used when considering two or more electrical power outlets located within the radius of reach of the driver.

At block 350, the vehicle power outlet advisory system provides guidance to the driver to locate and use the first power outlet. In an example implementation, the vehicle power outlet advisory system may display step-by-step instructions in a pictorial format on the GUI of an infotainment system in the vehicle and/or may issue oral instructions via the infotainment system. In some cases, where the driver may lack an object such as, for example, a charging cable, the vehicle power outlet advisory system may offer suggestions for obtaining the object (purchasing the object at a store located close to a current position of the vehicle or from a shop located on a travel route of the vehicle, etc.). The vehicle power outlet advisory system may cooperate with a GPS system in the vehicle for obtaining information about the location and/or the travel route.

Figure 4:
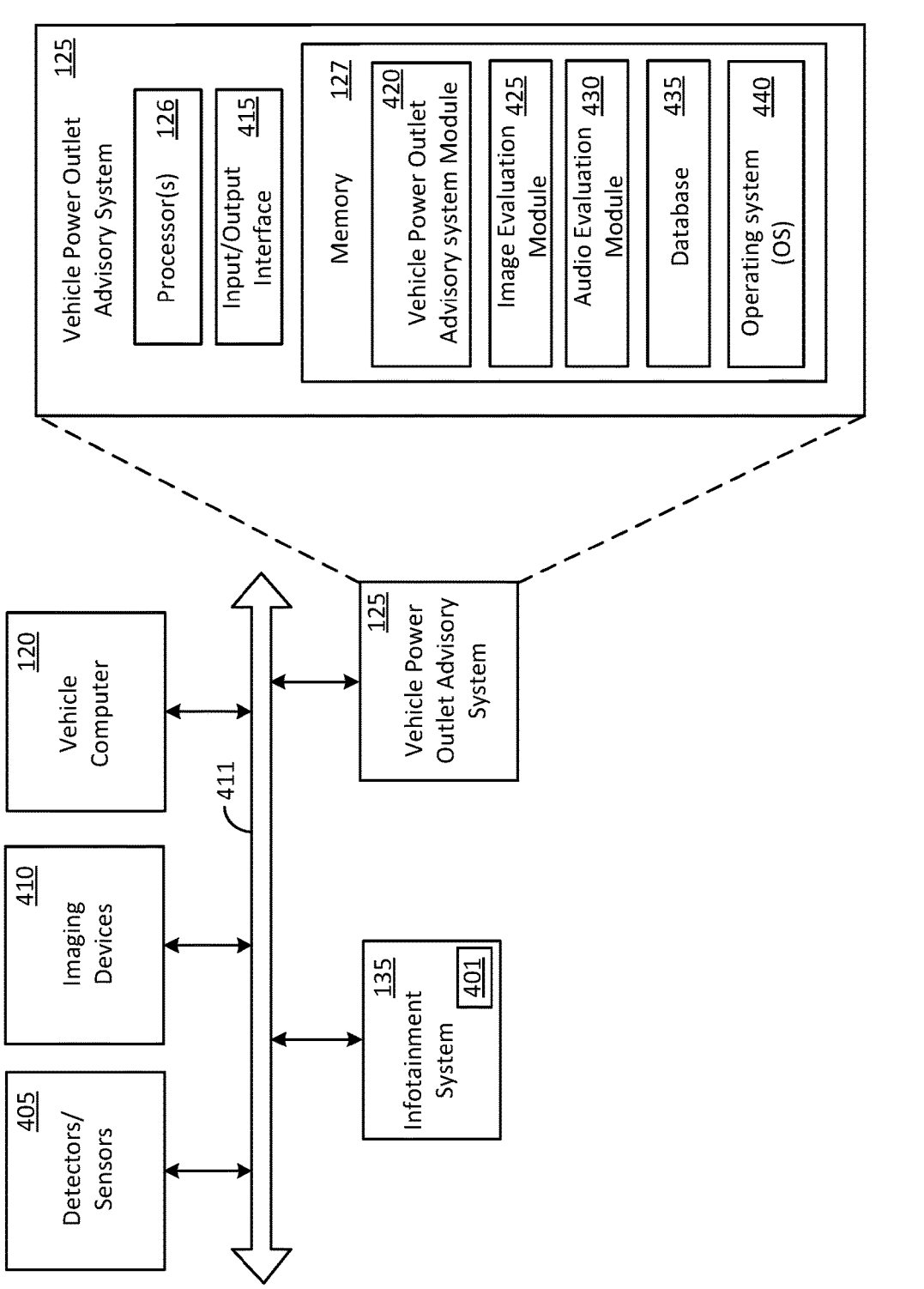
FIG. 4 shows some example components that can be included in a vehicle in accordance with an embodiment of the disclosure.

FIG. 4 shows some example components that can be included in the vehicle 105 in accordance with an embodiment of the disclosure. The example components can include detectors/sensors 405, imaging devices 410, the vehicle computer 120, the infotainment system 135, and the vehicle power outlet advisory system 125. The various components are communicatively coupled to each other via one or more buses such as an example a bus 411. The bus 411 may be implemented using various wired and/or wireless technologies. For example, the bus 411 can be a vehicle bus that uses a controller area network (CAN) bus protocol, a Media Oriented Systems Transport (MOST) bus protocol, and/or a CAN flexible data (CAN-FD) bus protocol. Some or all portions of the bus 411 may also be implemented using wireless technologies such as Bluetooth®, Bluetooth® Low Energy, Ultra-Wideband, Wi-Fi, Zigbee®, or near-field-communications (NFC).

The detectors/sensors 405 can include various types of detectors/sensors such as, for example, a magnetic sensor, a radar detector, a sonar detector, a capacitive sensor, a light detection and ranging (LIDAR) detector, and/or an infrared detector. The sensors can be any of various types of sensing devices such as, for example, a seat sensor, a magnetic sensor, a radar detector, a sonar detector, a light detection and ranging (LIDAR) detector, and/or an infrared detector. The sensors can be any of various types of sensing devices such as, for example, a seat sensor that is configured to provide to the vehicle computer 120 and/or the vehicle power outlet advisory system 125 a signal when a person sits on a seat in which the seat sensor is provided. In one case, the seat sensor can be a pressure transducer that produces an electrical signal when pressure is applied upon the pressure transducer as a result of the person sitting on the seat. Another type of sensor can be a position sensor coupled to a gearshift 116 that provides information about a position of the gearshift 116 (in drive, in park, in reverse, or in neutral).

The information may be conveyed to the vehicle power outlet advisory system 125 for determining a status of the vehicle 105 (moving, stopped, etc.).

The imaging devices can include any of various types of cameras such as, for example, a black-and-white camera, a color camera, an ultraviolet (UV) camera, a thermal camera, or an infrared camera. In the illustrated implementation shown in FIG. 1, the camera 110 and the camera 175 are example devices configured to provide information to the vehicle power outlet advisory system 125 in the form of images. In other implementations, additional cameras and/or other types of devices may be used to provide information to the vehicle power outlet advisory system 125. The images provided by the cameras may be evaluated by the vehicle power outlet advisory system 125 for various purposes. In an example scenario, the vehicle power outlet advisory system 125 may evaluate images provided by the camera 110 to detect a presence of one or more individuals seated in the vehicle 105 and/or to detect objects that may be coupled to electrical power outlets of the vehicle 105. The vehicle power outlet advisory system 125 may execute various actions upon one or more electrical power outlets provided in the vehicle 105 based on evaluating such images.

The signals conveyed by the various detectors of the detectors/sensors 405 to the vehicle power outlet advisory system 125 can vary in accordance with the type of detector. For example, the camera 110 can provide an image of the driver 165 (for example) in one of various formats (jpeg, mpeg, etc.).

The infotainment system 135 can include a display system having a GUI 401 for carrying out various operations. The GUI may be used, for example, by the driver 165 of the vehicle 105 to interact with the vehicle power outlet advisory system 125.

The vehicle power outlet advisory system 125 can be implemented in various ways. In one example implementation, the vehicle power outlet advisory system 125 can be an independent device (contained in an enclosure, for example). In another example implementation, some or all components of the vehicle power outlet advisory system 125 can be housed, merged, or can share functionality, with the vehicle computer 120. For example, an integrated unit that combines the functionality of the vehicle power outlet advisory system 125 with that of the vehicle computer 120 can be operated by a single processor and a single memory device. In the illustrated example configuration, the vehicle power outlet advisory system 125 includes the processor 126, an input/output interface 415, and a memory 127.

The input/output interface 415 is configured to support information transfer and communications between the vehicle power outlet advisory system 125 and other components coupled to the bus 411, such as, for example, to receive images from the imaging devices 410 and signals from the detectors/sensors 405.

The memory 127, which is one example of a non-transitory computer-readable medium, may be used to store an operating system (OS) 440, an image evaluation module 425, an audio evaluation module 430, a database 435, and various code modules such as, for example, a vehicle power outlet advisory system module 420. The code modules are provided in the form of computer-executable instructions that can be executed by the processor 126 for performing various operations in accordance with the disclosure.

The vehicle power outlet advisory system module 420 may be executed by the processor 126 for performing various operations in accordance with the disclosure. Some example operations are described above with reference to the flowchart 300. Execution of some of these operations can involve the vehicle power outlet advisory system module 420 utilizing the image evaluation module 425 (for evaluating images captured by a camera such as, for example, the camera 110) and the audio evaluation module 430 for evaluating voice signals received from an occupant of the vehicle 105 (such as, for example, a request for assistance in locating a suitable electrical power outlet in the vehicle 105).

The database 435 can be used to store data related to the various electrical power outlets in the vehicle 105 such as, for example, a location of one or more electrical power outlets, an availability of one or more electrical power outlets, a power handling capacity of one or more electrical power outlets, an efficiency rating of one or more electrical power outlets, and a voltage type (AC, DC, frequency, etc.). Other types of data that can be stored in the database 435 pertains to various types of devices such as, for example, power requirements of devices (based on brand, model number, manufacturer, for example) and types of connectors provided in various types of devices.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device, such as the memory 127, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the detector embodiments discussed above may comprise computer hardware, software, firmware, or any combination thereof to perform at least a portion of their functions. For example, a detector may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:

receiving, by a processor in a vehicle, a first image of an individual and a device;

determining, by the processor and based on the first image, that a gesture made by the individual is indicative of a request for assistance in powering the device;

determining, by the processor and based on the first image, a location of the individual in the vehicle and a reach radius of the individual;

determining, by the processor, a power consumption of the device;

identifying, by the processor, a power source in the vehicle that is compatible for powering the device;

identifying, by the processor, one or more power outlets that are located within the reach radius of the individual;

identifying, by the processor, among the one or more power outlets, an electrical power outlet that is coupled to the power source; and providing, by the processor, instructions to the individual, the instructions indicating a location of the electrical power outlet.

2. The method of claim 1, wherein determining, by the processor and based on the first image, that the gesture made by the individual is indicative of a request for assistance in powering the device comprises:

evaluating, by the processor, the first image; and identifying, by the processor, and based on the evaluation of the first image, the gesture made by the individual.

3. The method of claim 1, wherein determining, by the processor, the power consumption of the device comprises:

evaluating, by the processor, the first image;

identifying, by the processor and based on the evaluation of the first image, at least one of a type, a brand, or a model number of the device; and obtaining, by the processor, from a database, information about the power consumption of the device based on the at least one of the type, the brand, or the model number of the device.

4. The method of claim 3, further comprising:

evaluating, by the processor, at least one of an efficiency, a feature, or a power handling capacity of a second power outlet in the vehicle; and disregarding, by the processor, the second power outlet based on evaluating the at least one of the efficiency, the feature, or the power handling capacity of the second power outlet.

5. The method of claim 4, wherein powering the device comprises one of energizing the device or recharging a rechargeable battery contained in the device, and wherein the feature of the second power outlet is at least one of a shape or a pin configuration.

6. The method of claim 1, wherein determining, by the processor and based on the first image, a location of the individual in the vehicle and a reach radius of the individual comprises:

evaluating, by the processor, the first image; and identifying, by the processor and based on the evaluation of the first image, the location of the individual in the vehicle and the reach radius of the individual.

7. The method of claim 1, wherein identifying, by the processor, the one or more power outlets that are located within the reach radius of the individual comprises:

determining, by the processor, that the vehicle is in motion; and disregarding, by the processor, upon determining that the vehicle is in motion, at least a second power outlet that is located outside a cabin of the vehicle.

8. The method of claim 1, wherein identifying, by the processor, the one or more power outlets that are located within the reach radius of the individual comprises:

determining, by the processor, that the individual is a passenger seated in a passenger seat located in a rear portion of a cabin of the vehicle;

disregarding, by the processor, upon determining that the individual is the passenger seated in the passenger seat located in the rear portion of the cabin of the vehicle, at least a second power outlet that is located in a front portion of the cabin of the vehicle.

9. A method comprising:

receiving, by a processor in a vehicle, a first image;

detecting, by the processor, based on evaluating the first image, at least one of a type, a brand, or a model number of a device carried by an individual in the vehicle;

obtaining, by the processor, from a database, based on the at least one of the type, the brand, or the model number of the device, information about a power consumption of the device;

identifying, by the processor, a power source in the vehicle that is compatible for powering the device;

identifying, by the processor, a first power outlet in the vehicle that is coupled to the power source; and providing, by the processor, instructions to the individual, the instructions indicating a location of the first power outlet.

10. The method of claim 9, wherein identifying, by the processor, the first power outlet in the vehicle that is coupled to the power source comprises:

evaluating, by the processor, the first image;

determining, by the processor and based on the evaluation of the first image, a location of the individual in the vehicle and to determine a reach radius of the individual;

identifying, by the processor, one or more power outlets that are located within the reach radius of the individual; and identifying, by the processor, among the one or more power outlets, the first power outlet that is coupled to the power source that is compatible for powering the device.

11. The method of claim 10, wherein identifying, by the processor, the one or more power outlets that are located within the reach radius of the individual comprises:

determining, by the processor, that the vehicle is in motion; and disregarding, by the processor, upon determining that the vehicle is in motion, at least a second power outlet that is located outside a cabin of the vehicle.

12. The method of claim 10, wherein identifying, by the processor, the one or more power outlets that are located within the reach radius of the individual comprises:

determining, by the processor, that the individual is a passenger seated in a passenger seat located in a rear portion of a cabin of the vehicle;

disregarding, by the processor, upon determining that the individual is the passenger seated in the passenger seat located in the rear portion of the cabin of the vehicle, at least a second power outlet that is located in a front portion of the cabin of the vehicle.

13. The method of claim 9, wherein the individual is seated in the vehicle, and wherein the method further comprises:

detecting, by the processor, a gesture made by the individual; and determining, by the processor, that the gesture is indicative of a request for assistance in charging a rechargeable battery contained in the device.

14. The method of claim 13, wherein detecting the gesture made by the individual is based at least in part on a signal received from a motion sensor in the vehicle.

15. A vehicle comprising:

a power supply system comprising one or more power sources;

a plurality of power outlets coupled to the power source; and a vehicle power outlet advisory system comprising:

a memory that stores computer-executable instructions; and a processor configured to access the memory and execute the computer-executable instructions to at least:

receive a first image of an individual and a device;

determine, based on the first image, that detecting a gesture made by the individual is indicative of a request for assistance in powering the device;

determine, based on the first image, a location of the individual in the vehicle and a reach radius of the individual;

determine a power consumption of the device;

identify a first power source in the vehicle that is compatible for powering the device;

identify one or more power outlets of the plurality of power outlets that are located within the reach radius of the individual;

identify, among the one or more power outlets, a first power outlet that is coupled to the first power source; and provide instructions to the individual, the instructions indicating a location of the first power outlet in the vehicle.

16. The vehicle of claim 15, further comprising:

a sensor in communication with the processor and configured to provide a signal to the processor, the signal indicative of at least a part of the gesture made by the individual; and a camera in communication with the processor and configured to provide an image to the processor, the image indicative of at least another part of the gesture made by the individual.

17. The vehicle of claim 16, wherein the sensor is a motion sensor, and wherein the gesture is a motion made by the individual.

18. The vehicle of claim 17, wherein the one or more power sources comprises at least one of a battery, an alternating current (AC) source, or a direct current-to-alternating current (DC-to-AC) voltage converter, and wherein the plurality of power outlets comprises at least one of a two-pronged electrical socket, a three-pronged electrical socket, or a universal serial bus (USB) socket.

19. The vehicle of claim 18, wherein the first power outlet is located in a cabin of the vehicle, and wherein at least a second power outlet is located outside the cabin area of the vehicle.

20. The vehicle of claim 15, further comprising:

a wireless communication system configured to enable the processor to communicate with a database located outside the vehicle and obtain, from the database, data associated with the power consumption of the device.

* * * * *